Dec. 26, 1922.                                                                    1,440,093.
J. MILLER.
TROLLEY SHOE.
ORIGINAL FILED NOV. 13, 1915.

Inventor:
John Miller,
by Geo. S. Maxwell
Attorney.

Patented Dec. 26, 1922.

1,440,093

UNITED STATES PATENT OFFICE.

JOHN MILLER, OF AMESBURY, MASSACHUSETTS, ASSIGNOR, BY MESNE AND DIRECT ASSIGNMENTS, TO MILLER TROLLEY SHOE COMPANY, OF BOSTON, MASSACHUSETTS, A CORPORATION OF MASSACHUSETTS.

TROLLEY SHOE.

Application filed November 13, 1915, Serial No. 61,285. Renewed May 23, 1922. Serial No. 563,121.

*To all whom it may concern:*

Be it known that I, JOHN MILLER, a citizen of the United States, and resident of Amesbury, in the county of Essex and State of Massachusetts, have invented an Improvement in Trolley Shoes, of which the following description, in connection with the accompanying drawings, is a specification, like letters on the drawings representing like parts.

My present invention is an improvement in an overhead trolley shoe and harp for electric railways, and the object of the invention is to improve and perfect such devices. In my prior Patent No. 810,069, dated Jan. 16, 1906, I have shown and described a type of trolley shoe, of which the present invention is an improvement. I utilize the self-adjusting, spring-held shoe and trolley harp of my said prior invention, and employ therewith a novel arrangement of trolley harp and guide, of the contract block or shoe, and in the spring controlling feature.

An important advantage in my present improvement consists in the arrangement of the pivotal connection between the harp and the contact block or shoe and the steel leaf spring, whereby the spring, pivot, and harp-supporting portion are all protected by and concealed within the sides of the shoe or block. This protecting feature also guards the steel spring and metal pivot from the weather, and besides reducing the weight of metal necessary to a minimum, enables me to use non-corrosive metal for the outer or weather-exposed portions, hardened steel for the tongue which is in contact with the trolley wire, and ordinary tempered steel for the spring and pivot.

Other novel features of the invention consist in means to have the wire contacting and current transmitting part of the shoe made separately and of specially advantageous current conducting metal; to permit the quick and easy renewal of such contacting portion; and furthermore to provide a simple construction, one which will be noiseless and require no oiling of any moving parts, and to be economical to manufacture and efficient in use. Other details of the invention, novel combination of parts, and advantages will hereinafter be more fully pointed out and claimed.

Referring to the drawings illustrating a preferred embodiment of my invention,

Figure 1:
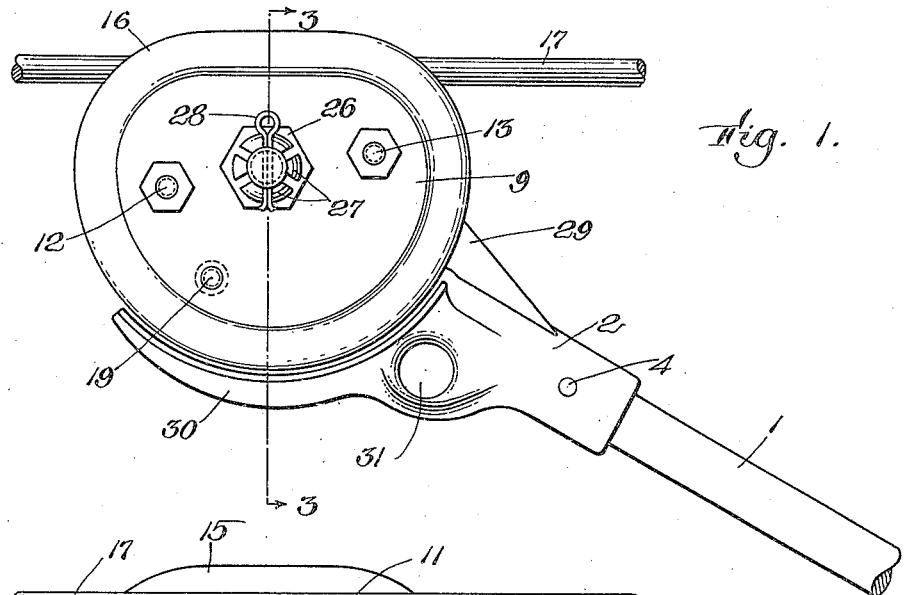
Fig. 1 is a side view of my improved trolley harp and shoe.

In the drawings, 1 indicates the supporting pole for the trolley harp 2, which is provided with a socket 3 adapted to be fitted over and upon the end of the pole 1 and be secured in place by a set screw or pin 4. The harp 2 is formed with centrally extending arms 5 and 6 uniting at their inner ends in a hub 7, bored to receive a pivot 8 which connects the sides of the shoe or block with the harp. In the construction shown in my prior patent, I utilized the ordinary forked shaped type of harp, but I find that this is disadvantageous in the extra weight of metal and expense of construction. I have eliminated the forked type of trolley harp in the present invention and have so constructed and arranged the trolley harp and shoe as to permit the harp portion to extend inside of the shoe, thus enabling the pivot and spring to be concealed and protected from injury, both from accident and from the weather. This feature is of special value in an article which must be constantly exposed to the weather, but which requires a steel spring to operate it.

Figure 3:
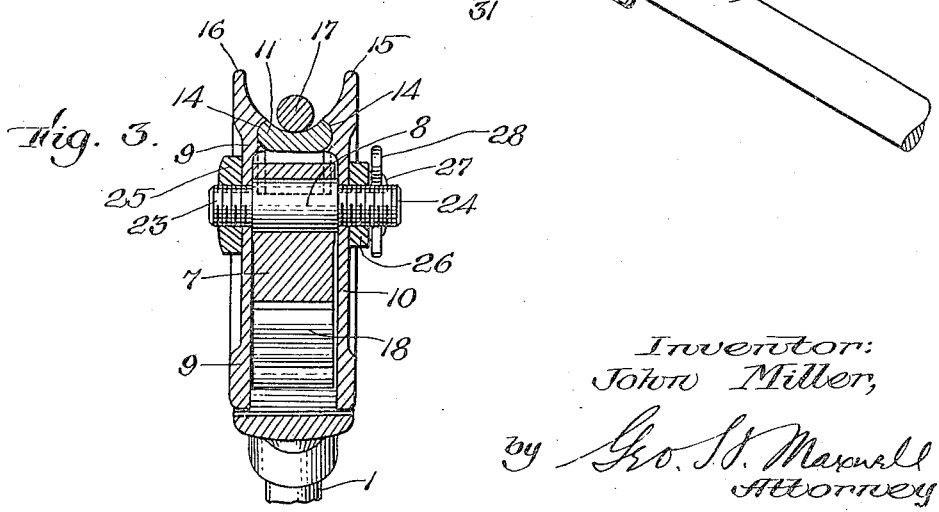
Fig. 3 is a cross sectional transverse view on the line 3—3 of Fig. 1.

The contact block or shoe comprises sides 9 and 10, preferably made of brass, aluminum, composition, or other non-corrosive metal, and adapted to clamp a metal tongue 11 between them. These sides are held together by bolts 12 and 13. I prefer to unite the tongue and sides by recessing the upper portions of the sides 9 and 10 as indicated at 14, in which recess the tongue 11 will fit and be rigidly held when the bolts 12 and 13 are tightened, thus acting as a brace for the sides. I also prefer to extend the sides 9 and 10 upwardly into flanged portions 15 and 16 respectively, which will extend above the trolley wire 17 and prevent the shoe from leaving the wire. The tongue 11 is formed with a substantially long straight contacting surface, to insure current conductivity from the wire 17 to the tongue, said tongue being preferably of vanadium steel, thus insuring long wear and a firm seating contact between shoe and wire. Such tongue also is preferably cup shaped slightly in cross section, as clearly shown in Fig. 3, to maintain contact with the wire 17 during any slight lateral movements between the wire and shoe.

Figure 2:
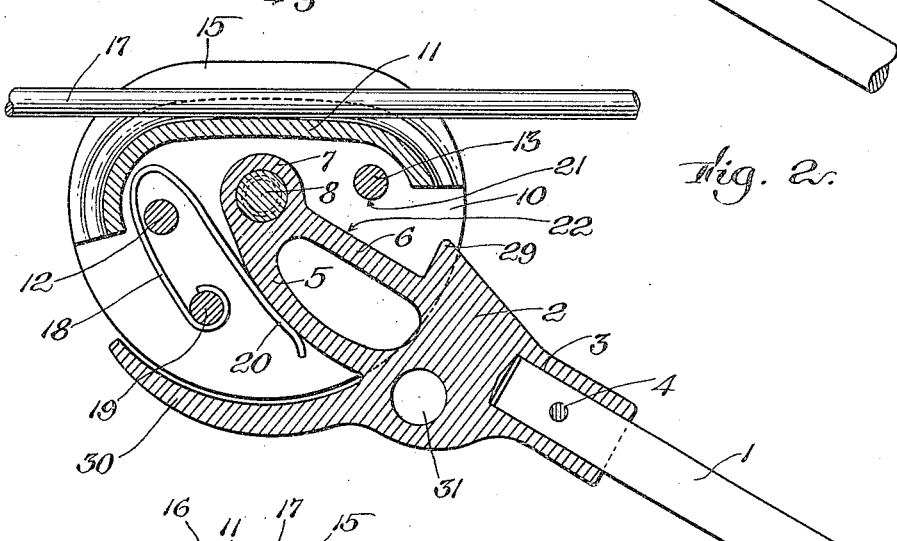
Fig. 2 is a cross sectional side view.

To maintain the shoe properly seated on the trolley wire irrespective of the angle of inclination of the harp and pole, I utilize a spring device similar to that of my said prior patent. In the present form I employ a leaf spring 18 with one end rigidly secured to a pin 19 between the sides 9 and 10, which pin may constitute a third bolt uniting said sides together, if desired. The free end portion 20 of the spring 18 bears directly upon the outer surface of the harp section 5. This spring acts to maintain the long flat bearing portion of the tongue 11 seated upon the wire by constantly tending to force the shoe relatively with the harp 2 around the pivot 8 until the lower point 21 of the bolt 13 strikes against the harp section 6 at 22, see Fig. 2. The pivot 8 is clamped firmly and rigidly with the sides 9 and 10 so that said pivot swings with the shoe, the outer portions 23 and 24 of said pivot being threaded to receive nuts 25 and 26 thereon, the nut 26 having locking means consisting in the bosses 27 spaced to receive a cotter pin 28 through a hole in the threaded portion 24, in well known manner. I also prefer to form guards on the harp 2, a forward guard 29 and a rearward guard 30, aiding in preventing the wire from catching should the shoe jump from the trolley, and also protecting the bearing and inner portion of the shoe. A hole 31 in the harp 2 permits the usual trolley rope to be attached to the harp, so as to pull down the shoe and pole 1 to remove the shoe from the wire or replace the shoe on the wire should it jump off.

The operation of my trolley harp and shoe has already been explained, and the advantages incident to this construction will be readily appreciated by those skilled in this art. The long tongue 11 being readily removable, enables the rest of the harp and shoe to be used indefinitely, simply by renewing the tongue. Such tongue is the least expensive wearing portion of the device, and the grooved fitting and curved ends of the tongue and shoe, facilitate economy of construction and speed in assembling. By having the harp portion inside of the sides 9 and 10, the pivot and spring are protected, and should the shoe jump off the wire no damage to the wire will result from being apt to be caught on parts of the harp, as is the case in a forked trolley harp. A further advantage in my improved construction is that it enables me to make the removable tongue of a wear-resisting material capable of receiving a high polish and effecting a minimum of wear upon the trolley wire, such tongue being also of suitable metal for conductivity. I find that vanadium steel meets these requirements and, in actual practice, will wear for upwards of five thousand miles in actual service, before renewal is necessary. Such renewal being easily and quickly effected prolongs the usefulness of the shoe and harp indefinitely, the sides and harp being capable of outwearing many successive tongues.

Having described my invention, what I claim as new and desire to secure by Letters Patent, is:

1. In an overhead device of the class described, a shoe having a pair of side portions carrying flanges, a removable tongue carried by said flanges of different metal from the side flanges, a support for said shoe extending between the side portions, a pivotal connection between the shoe and support, and a spring acting between the shoe and said support to maintain said shoe in predetermined position on the trolley wire.

2. In an overhead device of the class described, a shoe having a pair of side portions carrying a removable tongue, a support for said shoe extending between the side portions, a pivotal connection between the shoe and support, and a spring acting between the shoe and said support to maintain said shoe with the removable tongue in contact with the trolley wire.

3. In an overhead device of the class described, a shoe having a pair of side portions formed with grooved sections adapted to clamp a removable tongue between them, said tongue having a substantially straight portion and inwardly turned edges, and a spring acting between the shoe and said support to maintain said shoe with the straight portion of said tongue in contact with the trolley wire.

4. In an overhead device of the class described, a trolley harp adapted to support a shoe thereon having a limited pivotal movement, said shoe comprising side portions depending about said harp, a pivotal connection between the support and shoe, a tongue carried by the shoe above said pivot, means to clamp the sides together, stops to limit the pivotal movement, and a spring adapted to exert tension between the harp and sides to move normally the shoe on its pivot toward one of said stops.

5. In an overhead device of the class described, a trolley harp adapted to support a shoe thereon having a limited pivotal movement, said shoe comprising side portions depending about said harp, a pivotal connection between the support and shoe, recesses in the sides above said pivot adapted to receive and hold a removable tongue, a tongue fitted in said recesses having a relatively long, straight bearing portion to fit upon the trolley wire, means to clamp the sides together, and means to oscillate said shoe on the pivot to maintain the straight portion of said tongue normally in contact with the trolley wire.

6. In an overhead device of the class described, a trolley harp adapted to support a shoe thereon, having a limited pivotal movement, said shoe comprising side portions depending about said harp, a pivotal connection between the support and shoe, recesses in the sides above said pivot adapted to receive and hold a removable tongue, a tongue fitted in said recesses having a relatively long, straight bearing portion to fit upon the trolley wire, means to clamp the sides together, means to oscillate said shoe on the pivot to maintain the straight portion of said tongue normally in contact with the trolley wire, and a guard carried by the harp enclosing the side portions opposite to said tongue.

In testimony whereof, I have signed my name to this specification, in the presence of two subscribing witnesses.

JOHN MILLER.

Witnesses:
JAMES R. HODDER,
HAROLD J. CLARK.